United States Patent
Lee et al.

(10) Patent No.: US 9,422,814 B2
(45) Date of Patent: Aug. 23, 2016

(54) REPAIR OF A COATING ON A TURBINE COMPONENT

(75) Inventors: Glenn Lee, Singapore (SG); Om Prakash Yadav, Singapore (SG); Dylan Lim, Singapore (SG)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 1171 days.

(21) Appl. No.: 12/836,107

(22) Filed: Jul. 14, 2010

(65) Prior Publication Data

US 2011/0206533 A1   Aug. 25, 2011

(30) Foreign Application Priority Data

Feb. 25, 2010  (SG) ................ 201001161-7

(51) Int. Cl.
| | |
|---|---|
| *F01D 5/28* | (2006.01) |
| *F01D 5/00* | (2006.01) |
| *C23C 10/02* | (2006.01) |
| *C23C 10/04* | (2006.01) |
| *C23C 10/18* | (2006.01) |
| *C23C 10/28* | (2006.01) |
| *C23C 10/30* | (2006.01) |

(52) U.S. Cl.
CPC ............... *F01D 5/005* (2013.01); *C23C 10/02* (2013.01); *C23C 10/04* (2013.01); *C23C 10/18* (2013.01); *C23C 10/28* (2013.01); *C23C 10/30* (2013.01); *F01D 5/288* (2013.01); *F05D 2230/312* (2013.01); *F05D 2230/40* (2013.01); *F05D 2230/80* (2013.01); *F05D 2230/90* (2013.01); *Y02T 50/673* (2013.01); *Y10T 29/49318* (2015.01)

(58) Field of Classification Search
None
See application file for complete search history.

(56) References Cited

U.S. PATENT DOCUMENTS

| | | | | |
|---|---|---|---|---|
| 6,010,746 | A | * | 1/2000 | Descoteaux et al. .......... 427/142 |
| 6,103,315 | A | * | 8/2000 | Gray et al. .................... 427/454 |
| 6,485,780 | B1 | * | 11/2002 | Sangeeta et al. .............. 427/180 |
| 6,560,870 | B2 | | 5/2003 | Das et al. |
| 6,616,969 | B2 | * | 9/2003 | Pfaendtner et al. ........... 427/237 |
| 7,115,832 | B1 | | 10/2006 | Blankenship et al. |
| 7,588,797 | B2 | * | 9/2009 | Skoog et al. .................. 427/142 |
| 7,919,187 | B2 | * | 4/2011 | Hazel et al. ................... 428/446 |
| 2002/0045053 | A1 | | 4/2002 | Hoskin |
| 2006/0091117 | A1 | | 5/2006 | Blankenship et al. |

(Continued)

FOREIGN PATENT DOCUMENTS

| | | |
|---|---|---|
| JP | 5038582 A | 2/1993 |
| WO | WO/2007/147387 A2 | 12/2007 |

OTHER PUBLICATIONS

Hungarian Search Report from corresponding Singapore Application No. 201001161-7 Report dated: Sep. 7, 2011.

(Continued)

*Primary Examiner* — Richard Edgar
(74) *Attorney, Agent, or Firm* — Cantor Colburn LLP

(57) ABSTRACT

A method is provided for repairing an area of damaged coating on a component of a turbine module in a gas turbine engine, the component formed of a base material having a diffusion coating applied to the base material. The repair may be accomplished in place by directly heating the area to which a touch-up coating material has been applied with a hot gas plasma without the need to place the component in an oven for curing and heat treatment of the touch-up coating applied to the damaged area.

7 Claims, 3 Drawing Sheets

(56) References Cited

U.S. PATENT DOCUMENTS

| | | |
|---|---|---|
| 2006/0091119 A1 | 5/2006 | Zajchowski et al. |
| 2006/0093748 A1 | 5/2006 | Zajchowski et al. |
| 2007/0009660 A1* | 1/2007 | Sasaki et al. .................. 427/252 |
| 2007/0023402 A1 | 2/2007 | Zajchowski et al. |
| 2007/0087129 A1 | 4/2007 | Blankenship et al. |
| 2007/0164087 A1* | 7/2007 | Payne ........................... 228/119 |
| 2009/0208662 A1 | 8/2009 | Blankenship et al. |
| 2009/0314202 A1 | 12/2009 | Zajchowski et al. |
| 2010/0062180 A1* | 3/2010 | Tuppen et al. ................ 427/555 |

OTHER PUBLICATIONS

Compact Plasma Spray (CPS) System, Instruction Manual, Sulzer Metco, Instructions G58716 Issue—, Aug. 18, 2006, 37 pgs.

Extended European Search Report for European Application No. 11155709.6-1215; Date of Mailing: Apr. 28, 2011, 6 pages.

* cited by examiner

REPAIR OF A COATING ON A TURBINE COMPONENT

CROSS REFERENCE TO RELATED APPLICATION

This application claims priority to Singapore Patent Application No. 201001161-7 entitled "Repair of a Coating on a Turbine Component" filed on Feb. 25, 2010. The content of this application is incorporated herein by reference in its entirety.

FIELD OF THE INVENTION

This invention relates generally to the repair of turbine components for a gas turbine engine and, more particularly, to a method for repairing a damaged coating on a turbine vane without disassembly of the turbine module.

BACKGROUND OF THE INVENTION

Gas turbine engines, such as those used to power modern aircraft or in industrial applications, include a compressor for pressurizing a supply of air, a combustor for burning a hydrocarbon fuel in the presence of the pressurized air, and a turbine for extracting energy from the resultant combustion gases. Generally, the compressor, combustor and turbine are disposed about a central engine axis with the compressor disposed axially upstream of the combustor and the turbine disposed axially downstream of the combustor. Air drawn into the engine passes axially through the compressor into the combustor wherein fuel is combusted in the air to generate and accelerate combustion gases that pass through the turbine and out the exhaust nozzle of the gas turbine engine. The combustion gases turn the turbine, which turns a shaft in common with the compressor to drive the compressor.

As the hot combustion gases pass through the turbine, various turbine elements, such as the turbine stator vanes and turbine rotor blades of the turbine, are exposed to the hot combustion gases, which may also be corrosive to the material of which those turbine elements are made. In order to protect the turbine elements from oxidation and corrosion due to exposure to the hot combustion gases, it is conventional practice to coat various turbine elements with one or more layers of a protective coating or coatings. For example, it is known to coat turbine stator vanes in gas turbine engines with an aluminide during the process of manufacturing the turbine modules.

The turbine of the gas turbine engine is generally an axially extending assembly of a plurality of turbine modules mounted to a shaft. Each turbine module may include one or more turbine stages. Each turbine stage includes a row of stationary airfoils, referred to as the stator vanes, and a row of airfoils, referred to as rotor blades, mounted on a rotor disk driven by the airflow passing over the rotor blades. The turbine may include a high pressure turbine including a plurality of high pressure stages in one or more modules assembled to a common shaft with a high pressure compressor, as well as a low pressure turbine including a plurality of low pressure stages in one or more modules assembled to a common shaft with a low pressure compressor and/or fan.

In the handling of the turbine modules during shipping, assembling of the turbine, and disassembling of the turbine for servicing or overhaul, the protective coating on the turbine elements may be damaged in local areas for example nicked, scrapped, cracked, scored or otherwise removed thereby exposing the base metal of which the turbine element is composed. If the damage is deemed sufficient to warrant repair, it is customary to repair the damaged coating by removing the module including the damaged element and disassembling the module so that the assembly having the damaged element may be replaced or repaired.

To repair a damaged area of coating on a turbine stator vane according to conventional practice, it is common to disassemble the turbine module to remove the stator assembly containing the damaged vane for service. The coating may then be stripped from the damaged vane, at least in the region surrounding and including the area of damaged coating, the remainder of the damaged vane exclusive of the stripped area is then masked, and a new coating is then applied to the area of damaged coating and the stripped area. The stator assembly is then placed in a furnace or oven at a desired temperature for a desired period of time to cure and heat treat the newly applied coating. The turbine module is then reassembled with the repaired stator assembly. Although effective for repairing the damaged turbine element, the process is time consuming and labor intensive as the turbine module must be dissembled to affect the coating repair since the turbine module itself is too large to be placed in a conventional heat treatment furnace or oven. Further, even if a furnace or oven were large enough to accommodate an entire turbine module, the whole surface of the turbine module exclusive of the stripped area to which the new coating has been applied would need to be masked to reduce the risk of contamination of the undamaged surface during the heat treatment process.

U.S. Pat. No. 6,560,870 discloses a method of applying a diffusion metal coating to a selective area of a turbine engine component having a deficiency of metal coating. To apply the diffusion metal coating in accord with the disclosed method, a metal source containing tape is positioned in contact with the selective area and held in contact with the selective area using a tape holder that is stable at high temperatures while the selective area is heated to an effective temperature and an effective amount of time to form a metal coating of predetermined thickness on the selective area. In the disclosed embodiment, a quartz infrared lamp is used to heat the selective area to a coating temperature of about 1800 F to about 2000 F under an inert atmosphere for about 3 to 8 hours.

U.S. Pat. No. 7,115,832 discloses a portable, hand-controlled microplasma spray coating apparatus that can be transported to on-site locations in the field to apply ceramic and metallic coatings to a variety of workpieces, including gas turbine engine parts. However, the use of such a microplasma spray coating apparatus to directly spray a plasma coating onto a base material is not generally satisfactory for application of coatings that require some degree of diffusion of the coating material into the base material to be effective.

SUMMARY OF THE INVENTION

A method is provided for repairing an area of damaged coating on a component of a turbine module in a gas turbine engine, the component formed of a base material having a diffusion coating applied to the base material, the method comprising the steps of: blending the area of damaged coating with an area of coating surrounding the area of damaged coating; applying a touch-up coating material to the blended area; and directly heating the blended area to which the touch-up coating material has been applied with a hot gas plasma. The method may include the further step of masking an area surrounding the blended area prior to the step of directly heating the blended area to which the touch-up coating material has been applied with a hot gas plasma. In an embodiment, the component may comprise a turbine stator vane and the touch-up coating material may comprise an aluminide coating material.

The step of directly heating the blended area to which the touch-up coating material has been applied with a hot gas plasma may comprise heating the blended area to which the touch-up coating material has been applied with a hot gas plasma stream generated by a hand-controlled plasma gun. The step of directly heating the blended area to which the touch-up coating material has been applied with a hot gas plasma may comprise heating the blended area to which the touch-up coating material has been applied with a hot gas plasma stream generated by a hand-controlled microplasma coating spray gun having a gas nozzle and a powder coating injector, the powder coating injector being deactivated during the heating step.

In an aspect, a turbine vane formed of a base material having a diffusion coating of a coating material thereon includes an area of repaired coating. The area of repaired coating comprises a touch-up coating material applied to an area of damaged coating and partially diffused into the base material by directly heat treating the applied touch-up coating material with a hot gas plasma. In an embodiment, the applied touch-up coating material has been heat treated with a hot gas plasma stream generated by a hand-controlled plasma gun. In an embodiment, the applied touch-up coating material has been heat treated with a hot gas plasma stream generated by a hand-controlled microplasma coating spray gun having a gas nozzle and a powder coating injector, the powder coating injector being deactivating during the heat treatment. The touch-up coating material may comprise an aluminide coating material.

BRIEF DESCRIPTION OF THE DRAWINGS

For a further understanding of the disclosure, reference will be made to the following detailed description which is to be read in connection with the accompanying drawing, wherein.

DETAILED DESCRIPTION OF THE INVENTION

Figure 1:
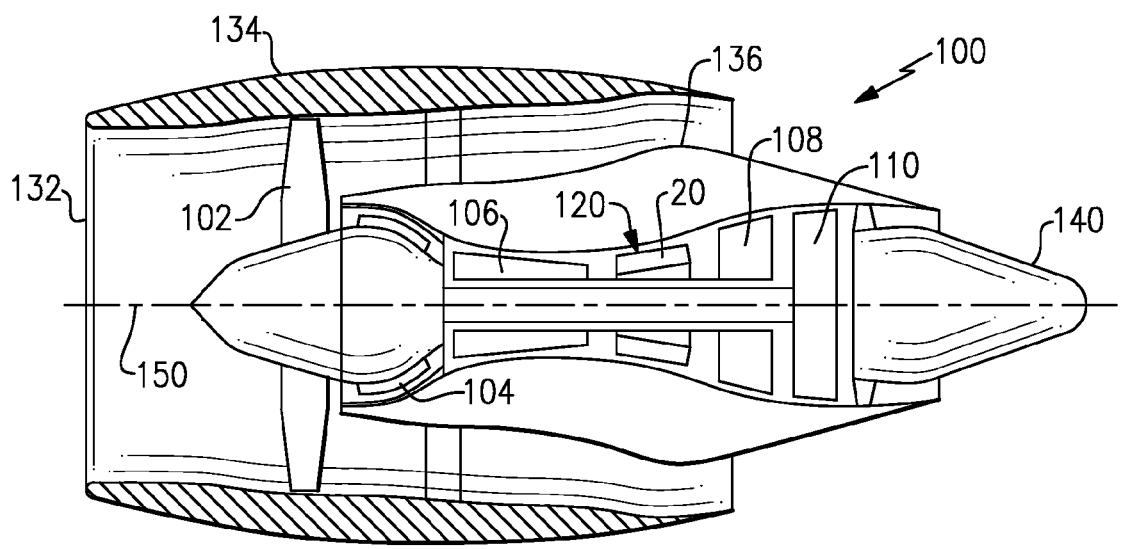
FIG. 1 is a schematic view of a longitudinal section of an exemplary embodiment of a turbofan gas turbine engine.

There is depicted in FIG. 1 an exemplary embodiment of a turbofan gas turbine engine, designated generally as 100, that includes, from fore-to-aft longitudinally about a central engine axis 150, a fan 102, a low pressure compressor 104, a high pressure compressor 106, a combustor module 120, a high pressure turbine 108, and a low pressure turbine 110. A nacelle forms a housing or wrap that surrounds the gas turbine engine 100 to provide an aerodynamic housing about gas turbine engine. In the turbofan gas turbine engine 100 depicted in the drawings, the nacelle includes, from fore to aft, the engine inlet 132, the fan cowl 134, the engine core cowl 136 and the primary exhaust nozzle 140. It is to be understood that the method described herein is not limited in application to the depicted embodiment of a gas turbine engine, but is applicable to other types of gas turbine engines, including other types of aircraft gas turbine engines, as well as industrial and power generation gas turbine engines.

Figure 2:
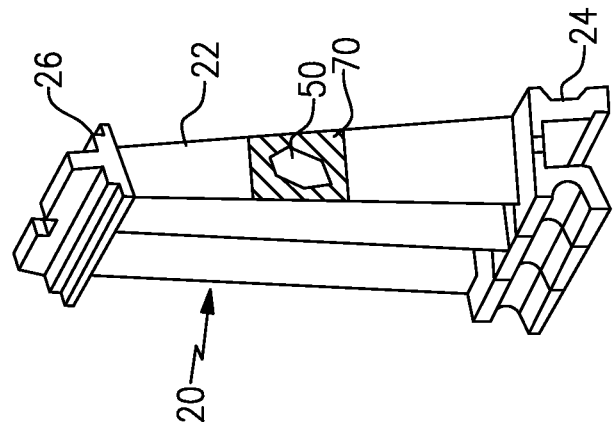
FIG. 2 is a perspective view of an exemplary turbine vane having an area of damaged coating.
Figure 3:
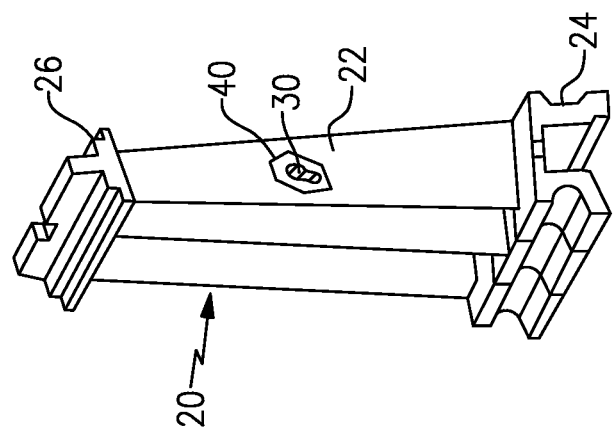
FIG. 3 is a perspective view of the turbine vane of FIG. 2 having a blended area surrounding the area of damaged coating.
Figure 4:
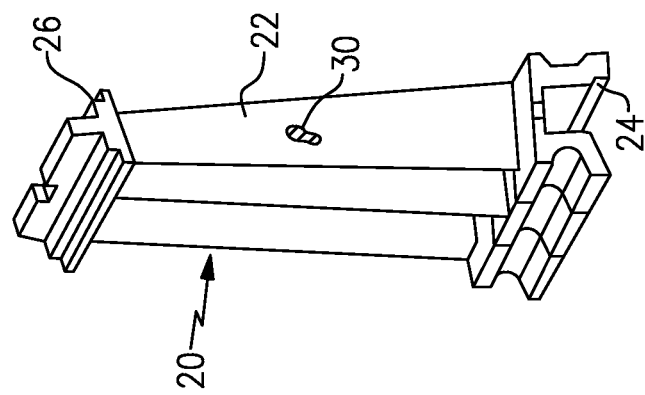
FIG. 4 is a perspective view of the turbine vane of FIG. 3 having a touch-up coating applied to the blended area and the area of damaged coating.

The method for repairing an area of damaged coating on a component of a turbine module in a gas turbine engine disclosed herein will be described in reference to the repair of an area of damaged coating on a turbine stator vane. Referring now to FIGS. 2-4, there is depicted a segment of a turbine stator assembly 20 of the low pressure turbine 110. The turbine stator assembly 20 includes a plurality of stator vanes 22 disposed at circumferentially spaced intervals about and extending radially between a radially inboard rim 24 and a radially outboard rim 26 circumscribing the radially inboard rim 24. Each of the stator vanes 22 is formed of a base metal coated with a layer of protective coating, such as an aluminide coating. For purposes of illustration, the depicted segment includes three stator vanes 22, one of which has an area 30 of damaged coating.

To repair the area 30 of damaged coating in accord with the method described herein, the area 30 of damaged coating is blended with an area 40 of undamaged coating surrounding the area of damaged coating. The blending may be accomplished by grit blasting the area 30 and area 40 followed by abrading the areas 30 and 40 with an abrasive. The abrasion blending may be performed, for example, by hand or by power with a hand-controlled power tool with abrasive-impregnated wheels, stones, and/or pads. Other forms of blending may be used that are also effective to remove any previously diffused portion of the coating remaining within the areas 30 and 40.

After completion of the blending process, a touch-up coating 50 is applied to the blended areas 30 and 40. The touch-up coating may be applied as a slurry brushed onto the blended areas 30 and 40. Alternatively, the touch-up coating 50 may be applied in a tape form. The tape may be impregnated with the touch-up material and may be cut to the shape of the blended areas 30 and 40. The touch-up coating may, for example, comprise an aluminide material.

The touch-up coating 50 applied to the blended areas 30 and 40 must be heated to first cure the touch-up coating 50 to partially diffuse the touch-up coating into the base metal of the stator vane 22. To properly cure the applied touch-up coating 50, the blended areas 30 and 40 must be heated to a temperature in the range of 155 C to 163 C (275 F to 325 F) for a period not less than fifteen minutes. Following curing, the blended areas 30 and 40 of the stator vane 22 must be heat treated at a higher temperature and for a longer period of time. For example, the heat treatment may be carried at a temperature in the range of 871 C (1600 F) for a period of at least four hours. The area surrounding the blended areas 30, 40 to which the touch-up coating has been applied may be masked with a protective tape 70 prior to heating the applied touch-up coating 50.

Figure 5:
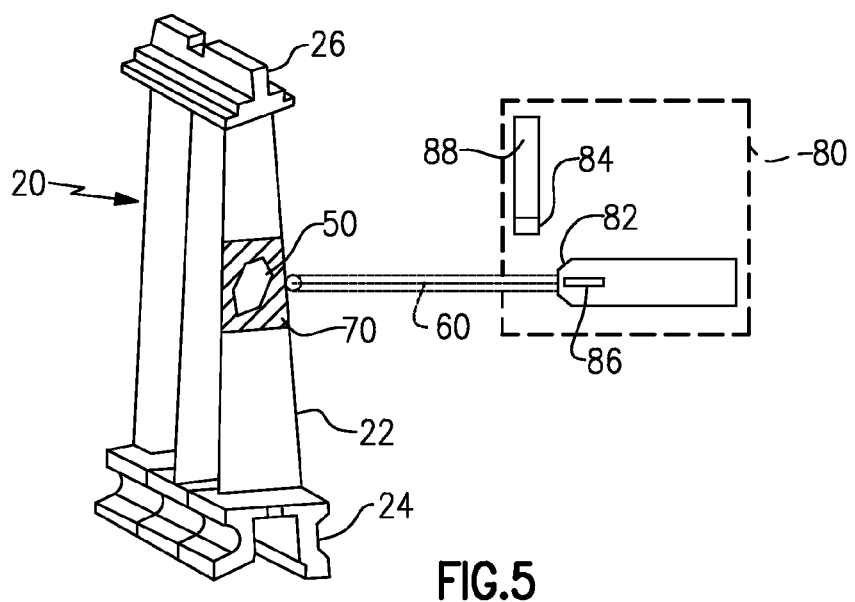
FIG. 5 is a partial schematic, partial perspective view illustrating the heat treatment of a touch-up coating in accordance with the method disclosed herein.

Instead of placing the stator assembly 20 in an oven for curing of the applied coating 50 and subsequent heat treatment, in the method disclosed herein, the necessary heating is accomplished in place by directly heating the blended areas 30 and 40 with a gas plasma jet 60, as illustrated in FIG. 5. The inert gas plasma jet may be generated using a portable microplasma spray coating apparatus having the coating powder dispensing function disabled. As illustrated schematically in FIG. 5, the microplasma spray coating apparatus 80, represented by the dashed outline, includes an arc gas emitter 82, an anode 84, a cathode 86, and a coating powdered material injector 88. In operation of the microplasma spray coating apparatus 80 in a conventional manner, an electric arc is generated between the anode 84 and the cathode 86. The plasma stream 60 is generated as the arc gas, such as, but not limited to, argon, injected from the emitter 82 passes through the electric arc generated between the anode 84 and the cathode 86. For a more detailed discussion of a portable microplasma spray coating apparatus, reference is made to U.S. Patent Application Publication No. US 2006/0093748, published May 4, 2006, the disclosure of which is hereby incorporated herein by reference in its entirety.

When the microplasma spray coating apparatus 80 is used in a conventional manner to apply a plasma spray coating to a workpiece, a powdered coating material is dispensed through the injector 88 into the plasma stream 60 and transported in the plasma stream 60 to the workpiece. However, in accord with an aspect of the method disclosed herein, the portable microplasma spray coating apparatus 80 may be used to generate the hot gas plasma stream 60 and direct the hot gas plasma stream 60 directly impinge upon the touch-up coating 50 applied to the blended areas 30 and 40 by disabling the powdered coating material dispensing function so that no powdered coating material is dispensed into the hot gas plasma stream. With the powdered coating material dispensing function disabled, the portable microplasma spray coating apparatus 80 generates only a pure hot gas plasma stream 60, for example an argon shrouded hot gas flame. Although the hot gas plasma stream may temporary reach temperatures in excess of 20,000 F as the arc gas is ionized in passing through the electric arc, the hot gas plasma stream 60 rapidly cools after passing through the electric arc.

The temperature of the hot gas plasma stream 60 directly impinging upon the touch-up coating material applied to the blended areas 30 and 40 on the turbine stator vane 22, as depicted in FIG. 5, may be controlled by adjusting the gas feed rates and the distance traveled by the hot gas plasma stream 60. Typically, the gas feed rate will range from about 3.8 to about 38 liters/minute (about 1 to about 10 gallons/minute). The portable microplasma spray coating apparatus 80 may be hand-controlled so as to selectively position the gas emitter 82 at a desired distance from the blended areas 30 and 40 on the turbine stator vane 22, typically at a distance ranging from about 76 to about 200 millimeters (about 3 to about 8 inches). The portable microplasma spray coating apparatus 100 may be hand-controlled so as to selectively control the time for which the hot gas plasma stream 60 actually heats the touch-up coating 50 on the blended areas 30 and 40.

A suitable portable microplasma spray coating apparatus for use in directly heating the blended area 30, 40 to which the touch-up coating material 50 has been applied with a hot gas plasma in accord with an aspect the method disclosed herein is the Compact Plasma Spray (CPS) System, a portable thermal spray system commercially available from Sulzer Metco (US) Inc. of Westbury, N.Y., USA. The Sulzer Metco CPS system uses argon as the plasma gas and has a maximum power of 3 kW, a maximum DC amperage of 50 amps, and a maximum DC voltage of 40 volts.

Figure 6:
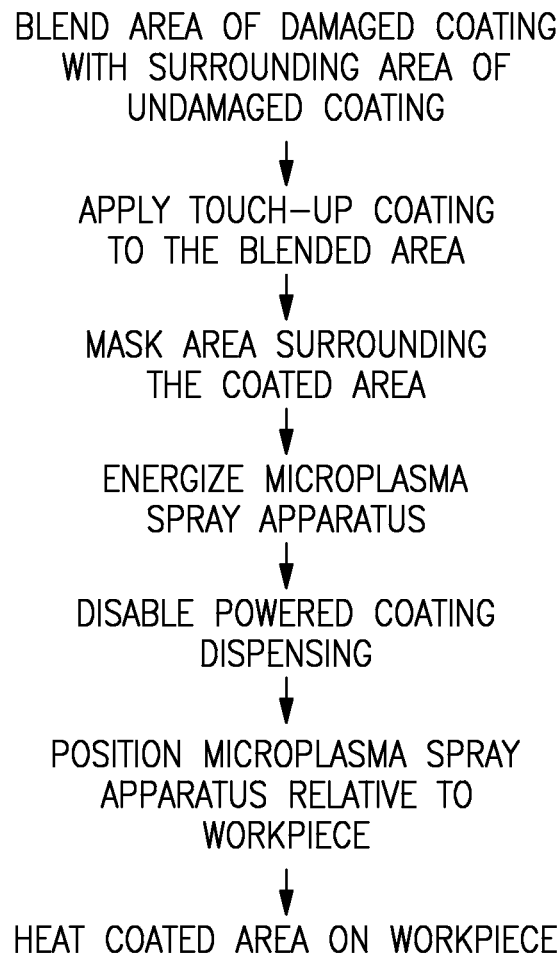
FIG. 6. is a flow chart illustrating an exemplary embodiment of a method of repairing a damage coating on a turbine element.

Referring now to FIG. 6, a process flow chart is depicted generally illustrating an exemplary embodiment of the method disclosed herein. Initially, an area of damaged coating 30 and an area 40 surrounding the area of damaged coating are blended. After completion of the blending step, a touch-up coating material 50 is applied to the blended area 30, 40, such as by application of a slurry of coating material or application of a tape impregnated with coating material. The area surrounding the area 30, 40 to the touch-up coating material 50 has been applied is masked. The microplasma spray coating apparatus 80 is then energized and the powdered coating dispensing function is disabled. It is to be understood that the powdered coating dispensing function could be disabled either before or after the microplasma spray coating apparatus 80 is energized. The microplasma spray coating apparatus is selectively positioned a desired distance from the workpiece and aimed at the area of touch-up coating 50. The flow of gas through the emitter 82 is then initiated at the desired gas flow rate to affect direct heating of the blended area 30, 40 to which the touch-up coating material 50 has been applied with a hot gas plasma to partially diffuse the applied touch-up coating material into the base material of the workpiece. The use of the pure hot gas plasma stream generated by the microplasma coating apparatus 80 with its powdered dispensing function disabled substantially reduces the risk of coating contamination.

The method disclosed herein allows for the in-situ repair of localized areas of damaged coating on a turbine component of a gas turbine engine without dissembling the turbine module. By eliminating the need to disassemble one or several stages of a turbine to remove a turbine module having a component with a localized area of damaged coating, application of the method disclosed herein will reduce maintenance cost and reduce repair turnaround time. The application of the hot gas plasma stream directly to the localized area to which a touch-up material has been applied provides sufficient heat energy to partially diffuse the coating material into the base material so that coating orientation has no significant effect on tensile or fatigue properties. Additionally, the likelihood of bond defects or abnormal grain structures or porosities is minimized. The method disclosed herein may be used to repair localized areas of damaged coating on components having simple or complex structures.

The terminology used herein is for the purpose of description, not limitation. Specific structural and functional details disclosed herein are not to be interpreted as limiting, but merely as basis for teaching one skilled in the art to employ the present invention. While the present invention has been particularly shown and described with reference to the exemplary embodiments as illustrated in the drawing, it will be recognized by those skilled in the art that various modifications may be made without departing from the spirit and scope of the invention. Those skilled in the art will also recognize the equivalents that may be substituted for elements described with reference to the exemplary embodiments disclosed herein without departing from the scope of the present invention.

Therefore, it is intended that the present disclosure not be limited to the particular embodiment(s) disclosed as, but that the disclosure will include all embodiments falling within the scope of the appended claims.

We claim:

1. A method for repairing an area of damaged aluminide coating on a component of a turbine module in a gas turbine engine, the component formed of a base material having a diffusion aluminide coating applied to the base material, the method comprising the steps of:
   blending the area of damaged aluminide coating with an area of undamaged aluminide coating surrounding the area of damaged aluminide coating by grit blasting;
   applying an aluminide touch-up coating material to the blended area; and
   curing the aluminide touch-up coating applied to the blended area by heating the aluminide touch-up coating to a first temperature with a hot gas plasma stream generated by a portable microplasma spray coating apparatus.

2. The method as recited in claim 1 further comprising directly heating the blended area to which the aluminide touch-up coating has been applied to a second temperature with the hot gas plasma stream generated by the portable microplasma spray coating apparatus, the second temperature being higher than the first temperature.

3. The method as recited in claim 2 wherein the step of heating the blended area to which the aluminide touch-up coating material has been applied with the hot gas plasma stream generated by the portable microplasma spray coating apparatus comprises the step of heating the blended area to which the aluminide touch-up coating material has been applied with the hot gas plasma stream generated by the portable microplasma spray coating apparatus having a gas nozzle and a powder coating injector, the powder coating injector being deactivated during the heating step.

4. The method as recited in claim 1 further comprising the step of abrading said grit-blasted area with an abrasive device.

5. The method as recited in claim 1 wherein the step of applying an aluminide touch-up coating material to the blended area comprises applying a slurry including the aluminide touch-up coating material to the blended area.

6. The method as recited in claim 1 wherein the step of applying an aluminide touch-up coating material to the blended area comprises applying a tape carrying the aluminide touch-up coating material to the blended area.

7. The method as recited in claim 1 further comprising controlling a temperature of the hot gas plasma stream by adjusting a gas feed rate of the portable microplasma spray coating apparatus.

* * * * *